UNITED STATES PATENT OFFICE.

AUGUST STOCK AND FRIEDRICH HEIM, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

BLUE TRIPHENYLMETHANE DYESTUFF.

995,494.  Specification of Letters Patent.  Patented June 20, 1911.

No Drawing.  Application filed May 23, 1910. Serial No. 562,977.

*To all whom it may concern:*

Be it known that we, AUGUST STOCK, Ph. D., chemist, and FRIEDRICH HEIM, Ph. D., chemist, citizens of the Empire of Germany, residing at Höchst-on-the-Main, Germany, have invented certain new and useful Improvements in New Violet to Blue Dyestuffs of the Triphenylmethane Series and Processes of Making the Same, of which the following is a specification.

By condensing the p-chlorobenzaldehyde with ortho-oxy-aryl-carboxylic acids and oxidizing the leuco derivatives thus obtained, there are produced dyestuffs capable of being subsequently chromed, which are however of little interest on account of the fact that they are not fast alkalis. Now we have found, that by heating these dyestuffs with aromatic bases, they are transformed into other coloring matters which are of great value owing to their pure tint and their great fastness to alkalis and milling. The reaction with the aromatic bases occurs already at the temperature of the water-bath; by adding a salt of the base it can be accelerated, but this is unnecessary. The reaction may also be effected in presence of a solvent, such as acetic acid of 90% strength.

Example: One part by weight of the coloring matter obtained from p-chlorobenzaldehyde and ortho-cresotinic acid is heated on the water-bath with five times its weight of p-toluidin and an equal weight of p-toluidin-hydrochlorid. The melted mass which is at first yellowish-red soon assumes a reddish-violet coloration. When no further alteration of the color is perceptible, the melted mass is rendered alkaline by means of carbonate of soda and the excess of the base is blown off by means of water-vapor. From the remaining solution the coloring matter is precipitated by means of a mineral acid, filtered and washed. When dry, it forms a dark powder of metallic luster soluble in a solution of sodium carbonate or sodium acetate with a violet-red color, soluble with a violet color in water, ethyl- and methyl-alcohol, soluble in concentrated sulfuric acid with a reddish yellow color, insoluble in benzene, ether and chloroform, its aqueous solution turning bluish-red on addition of caustic soda lye, and dyeing wool in an acid bath violet-gray tints which on being treated with a bichromate and acid, turn into bright violet-blue tints of great fastness to milling. The dyeings, which can be subsequently chromed, are of a very pure violet tint, and of excellent fastness to alkalis and milling.

Having now particularly described our invention what we claim is:

1. The process of manufacturing violet to blue dyestuffs of the triphenylmethane series capable of being subsequently chromed, which consists in heating with aromatic bases the coloring matters obtained by oxidizing the condensation product of p-chlorobenzaldehyde and ortho-oxy-aryl-carboxylic acids.

2. As new products, the dyestuffs obtainable by heating with aromatic bases the coloring matters produced from p-chlorobenzaldehyde and ortho-oxy-aryl-carboxylic acids, which dyestuffs are, after being dried and pulverized, in the form of their sodium and ammonium-salts, dark powders of a metallic luster, being soluble with a violet color in water, ethyl- and methyl-alcohol, also soluble in concentrated sulfuric acid with a reddish-yellow color, insoluble in benzene, ether and chloroform, their aqueous solution turning bluish-red on addition of caustic soda lye; dyeing wool in an acid bath violet-gray tints which, on being treated with a bichromate and acid turn into bright violet-blue tints of great fastness to milling.

3. As a new product, the dyestuff obtainable by heating with p-toluidin the coloring matter produced from p-chlorobenzaldehyde and ortho-cresotinic acid, which dyestuff is, after being dried and pulverized, in the form of its sodium- and ammonium-salt, a dark powder of a metallic luster, being soluble with a violet color in warte, ethyl- and methyl-alcohol, also soluble in concentrated sulfuric acid with a reddish yellow color, insoluble in benzene, ether and chloroform, its aqueous solution turning bluish-red on addition of caustic soda lye; dyeing wool in an acid bath violet-gray tints which on being treated with a bichromate and acid, turn into bright violet-blue tints of great fastness to milling.

In testimony whereof, we affix our signatures in presence of two witnesses.

AUGUST STOCK.
FRIEDRICH HEIM.

Witnesses:
JEAN GRUND,
CARL GRUND.